June 29, 1943.  J. B. DICKSON ET AL  2,322,962
LAMINATED ARTICLE
Filed Dec. 23, 1939  3 Sheets-Sheet 1
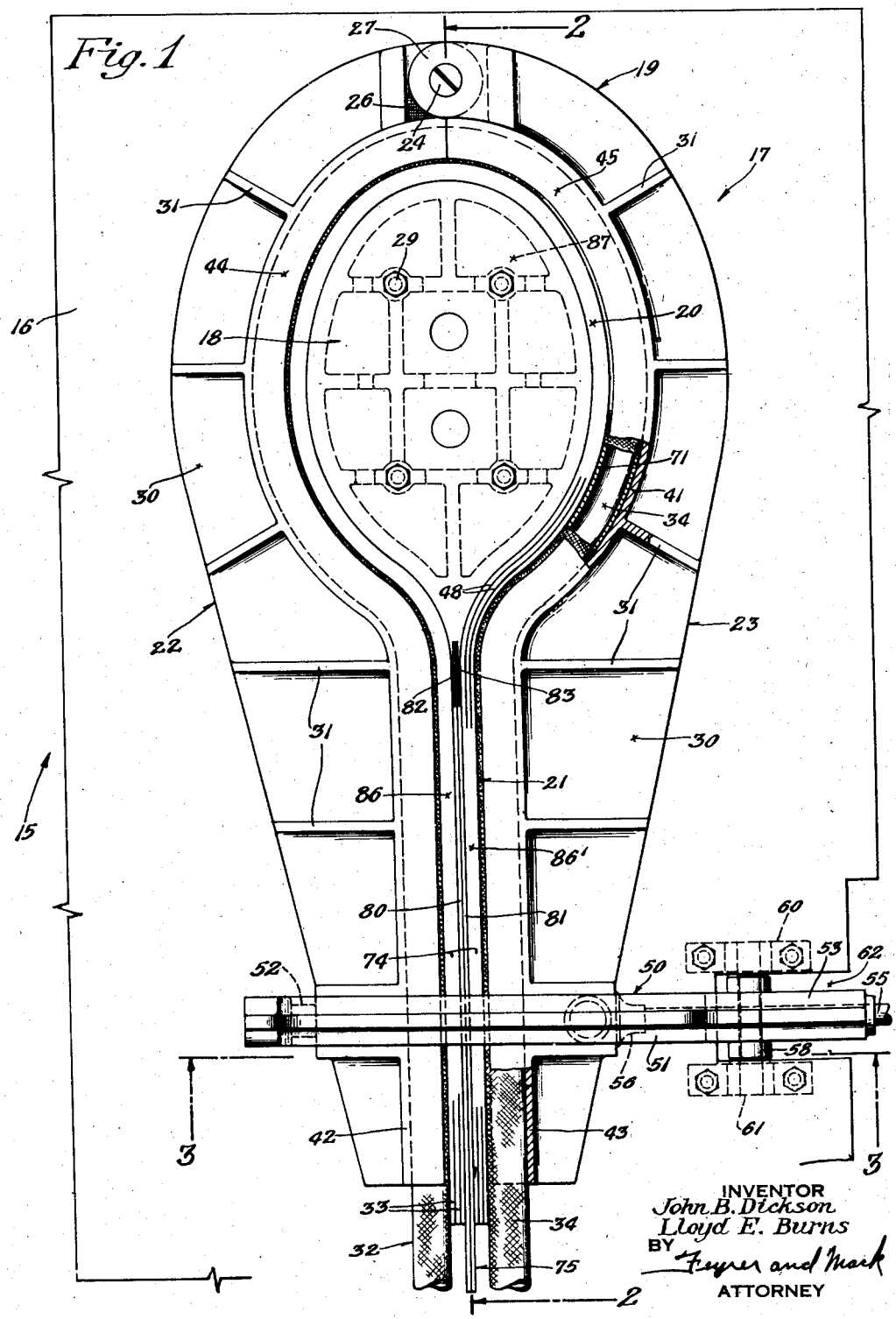

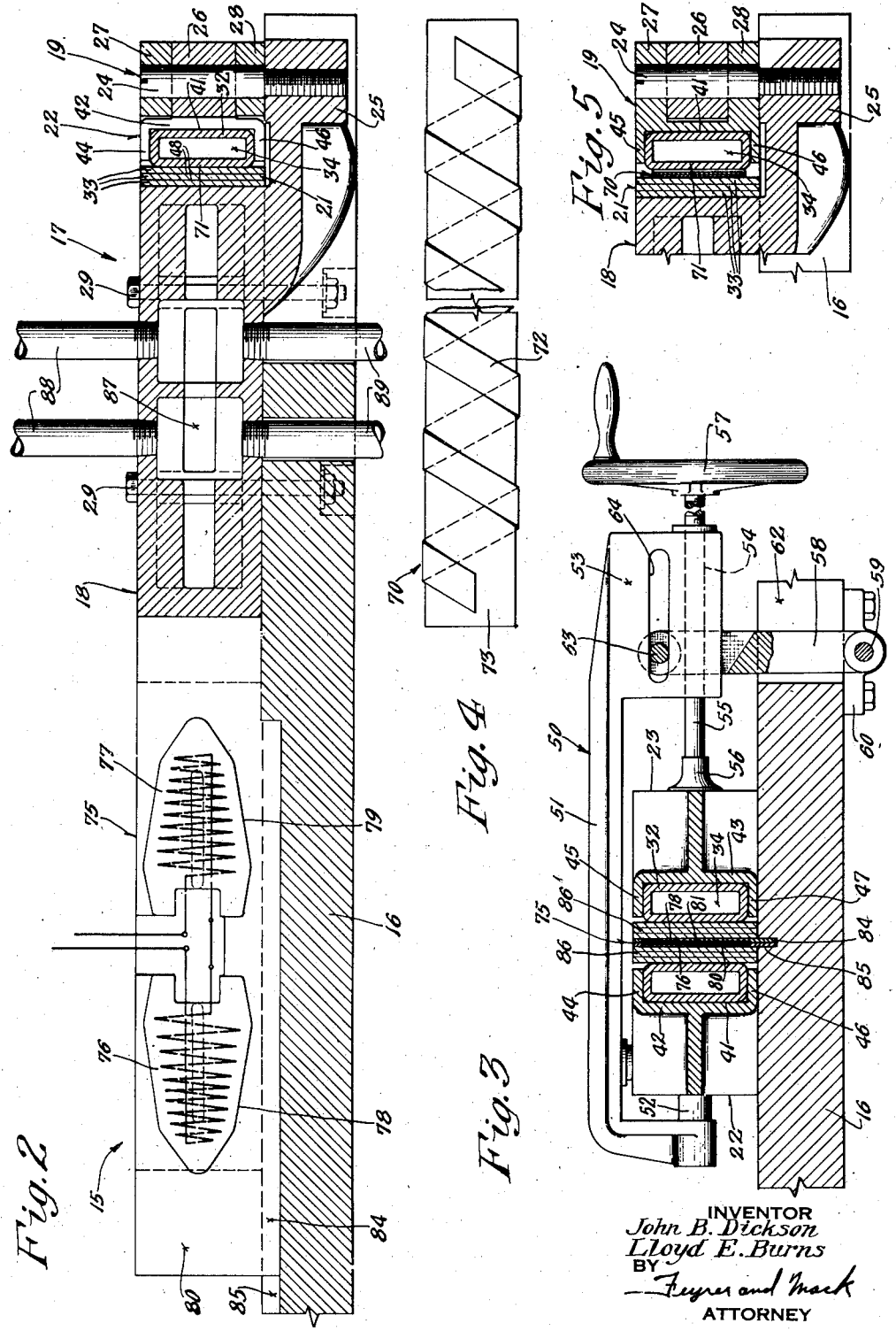

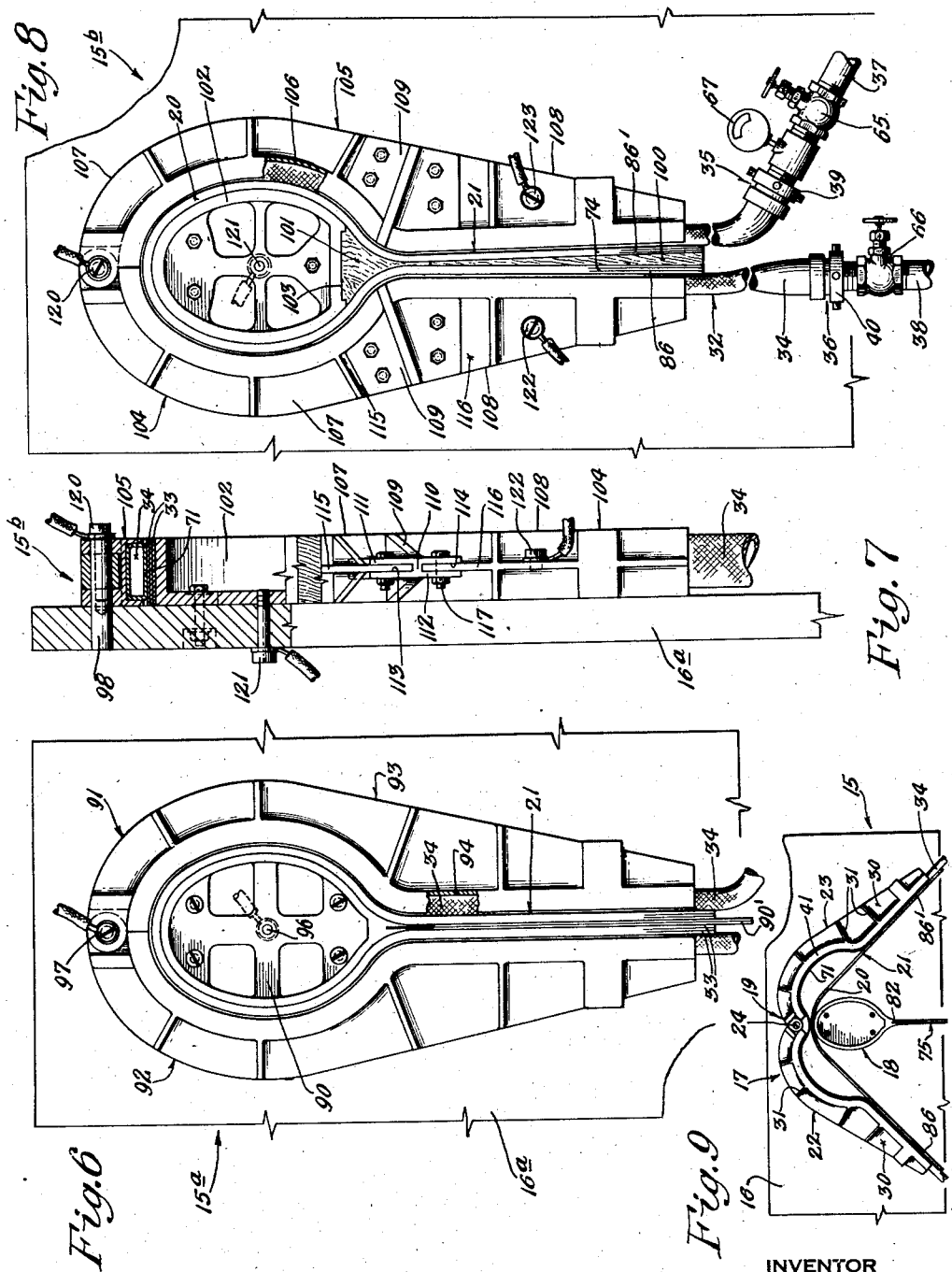

Patented June 29, 1943

2,322,962

UNITED STATES PATENT OFFICE 2,322,962

LAMINATED ARTICLE

John B. Dickson, Northampton, and Lloyd E. Burns, Springfield, Mass., assignors to A. G. Spalding & Bros. Inc., Chicopee, Mass., a corporation of Delaware Application December 23, 1939, Serial No. 310,774

3 Claims. (Cl. 144—259)

This invention relates to improvements in laminated articles, and more particularly to rackets the frames of which are built up of a plurality of plies of veneer secured together by an adhesive.

The many advantages of a laminated over a solid frame construction for rackets are well appreciated by both the industry and the public. These advantages include greater strength, less tendency to warping, freedom from weaknesses caused by stresses set up in bending the same to the required curvatures, more uniformity from one racket to another achieved by the possibility of offsetting the inherent variability of the wood by assortment of the veneers, the possibility of the combination of different wood veneers and other laminations within a single racket to give at the same time improved mechanical properties and pleasing appearance.

The usual practice, in the past, for bending and bonding together the laminations of such rackets, has involved the use of rigid mechanical equipment. The equipment usually used in the past has a number of disadvantages. One of the most troublesome of these disadvantages is the necessity of extreme mechanical accuracy in such equipment to insure application and maintenance of uniform pressure over the entire bonding area. Unavoidable variation in thickness of the various veneers, as well as differences in resistance to bending at various points of the curvature make variations in pressure extremely likely and also require the use of excessive pressure at some points in order to maintain a minimum bonding pressure at other points and over the entire area.

It is an object of the present invention to provide a method and an apparatus by which the above-mentioned disadvantages of the prior and usual practice of shaping and bonding the laminations of a racket frame are overcome.

Another and related object of the invention is to provide a method and an apparatus for shaping and bonding the laminations of a racket frame, in which equalized pressure is maintained over the entire area of the laminations.

A further object of the invention is the provision of a simplified method and a simplified apparatus, with attendant reduction in manufacturing cost, for shaping and bonding together laminations making up a racket frame.

A feature of the invention, resulting in the attainment of the above objects, resides in the provision of a method wherein uniform fluid pressure is applied to superposed veneer strips through a flexible member to press the strips together with an adhesive therebetween and to simultaneously press the strips into a predetermined racket shape.

Another feature of the invention resides in the provision of an apparatus including a forming means defining a racket shape, and a flexible member adapted to confine a fluid under pressure and cooperable with the forming means to press together and into a predetermined racket shape a plurality of superposed veneer strips with an adhesive therebetween.

Another feature of the invention resides in the provision of a method and an apparatus in which heat is applied to the adhesive between the laminations while they are pressed together and into a racket shape by means of a fluid-actuated flexible member.

A further feature of the invention, related to the above, resides in the provision in the racket-frame-shaping- and -bonding apparatus, of means for subjecting the adhesive between the laminations to the heating action of an electrostatic field.

Still another feature of the invention consists in the utilization as a bonding medium between the racket frame laminations, of a heat-hardening adhesive and/or an adhesive which is waterproof.

Another object of the invention is to provide an improved shaped and bonded laminated article.

Other objects and features will hereinafter appear.

In the drawings:

Figure 1 is a top view of an apparatus embodying the present invention.

Fig. 2 is a sectional view taken on the line 2—2 of Fig. 1.

Fig. 3 is a sectional view taken on the line 3—3 of Fig. 1.

Fig. 4 is a detail view of a flexible heating unit which may be used with the apparatus shown in Figs. 1, 2 and 3.

Fig. 5 is a fragmentary sectional view illustrating the manner in which the heating unit shown in Fig. 4 is used with the apparatus shown in Fig. 2.

Fig. 6 is a top view, similar to Fig. 1, but showing a modified form of apparatus embodying the present invention.

Fig. 7 is a side view, partially in section, of the apparatus shown in Fig. 8.

Fig. 8 is a top view, similar to Fig. 6, but showing another modified form of the present invention.

Fig. 9 is a detail view of the apparatus, showing the same in an open position.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring more particularly to the drawings and first to Figs 1 through 5 wherein there is illustrated one preferred form of the apparatus 15 for carrying out the method forming the subject matter of the present invention, there is shown a support 16 which advantageously may be provided by a top of a bench or table.

Associated with the support 16 is a forming means 17 including an inner form 18 and an outer form 19. As shown, the inner form 18 is shaped to define the inner contour of the head 20 of a racket frame 21, while the outer form includes a pair of confining arms or members 22 and 23 mounted for pivotal movement relative to the inner form, as on a stud 24 secured to an extension bracket 25 on the inner form and passing through an ear 26 on one of the confining arms 22 and ears 27 and 28 on the other confining arm 23. Suitable bolt and nut connections 29 may be provided for securing the forming means 17 to the support 16. Preferably, these confining arms 22 and 23, which may be of metal, are reinforced as by a web 30 and ribs 31 to give them added strength.

Of importance there is associated with the forming means a flexible member 32 through which, by means of a suitable fluid, equalized pressure may be applied throughout the entire surface area of the racket frame 21 being pressed and shaped thereby.

As shown, the frame 21 is of laminated construction, comprising a plurality of superposed and adhesively secured veneer plies 33 which may be of wood or of other suitable material. Alternatively some of the plies may be of wood and one or more of the plies of other material, for example reinforcing material.

Frames of this general character are well known and have been widely and favorably accepted and used. However, in prior practice considerable difficulty has been encountered in achieving a uniform or equalized pressure throughout the frame in the pressing and shaping thereof. Such equalized pressure is highly desirable and is of the utmost importance in order to avoid the necessity of excessive pressures at certain points in order to provide at other points the minimum pressure required to effect a satisfactory adhesive bond between the plies 33.

The flexible member 32 through which this equalized pressure is achieved, as shown, may be and preferably is in the form of a flexible bag 34 adapted to confine a fluid which may be directed to and from the bag under pressure by suitable connections 35 and 36 respectively, with an inlet conduit 37 from a source of fluid under pressure and with an outlet conduit 38, as most clearly illustrated in Fig. 8. These connections 35 and 36 may include conventional hose couplings 39 and 40, and the fluid-confining bag advantageously may be substantially in the form of a hose. It is important, however, that the bag 34 be of flexible construction as may be achieved conveniently if the material of the same is, for example, rubber or rubber reinforced with fabric.

For confining the bag 34 and suitably maintaining the same in proper relation with the forming means 17, a continuous channel 41 is provided in the confining arms, the channel being defined by inner walls 42 and 43 on the respective confining arms 22 and 23, which substantially conform with the racket-frame shape, and by upper shoulders 44 and 45 and lower shoulders 46 and 47. The size of the channel is so proportioned relative to the bag 34 that when the fluid is introduced into the latter the inner wall thereof is forced inwardly beyond the upper and lower shoulders and into uniform and equalized pressing engagement with the laminated frame 19 positioned intermediate the bag 34 and the inner form.

In the operation of the apparatus 15, a plurality of veneer plies 33 are superposed with a suitable adhesive 48 therebetween. The adhesive, which is preferably a waterproof adhesive, may be applied to the veneer plies or sheets in an initially liquid or plastic state or may be applied in the form of thin dry sheets, and preferably, for reasons that will hereinafter be pointed out, is of a type which is heat hardening.

These superposed plies 33 are placed in the forming means 17 as shown in Fig. 9, and the confining arms 22 and 23 are drawn inwardly to bend the plies constituting the laminated frame into a substantially U-shape. When the arms have been moved substantially into an operative inward position an adjustable clamping device 50 may be utilized to draw and clamp the arms into a completely operative position.

As shown, the clamping device 50, illustrated most clearly in Figs. 1 and 3, includes an extended U-shaped member 51 having an insulating-arm-engaging head 52 secured to one side thereof and having a base 53 at the other side thereof formed with a threaded bore 54 therein. Extending through this threaded bore is an elongated tightening bolt 55, having an insulating-arm-engaging head 56 at one end and conveniently provided with a hand wheel 57 at the other end by which the heads 52 and 56 may be moved toward and away from each other.

Preferably, the U-shaped member is pivotally mounted to be swung away from the forming means 17 so as not to interfere therewith when the confining arms are swung into and out of the expanded inoperative position shown in Fig. 9. To this end a frame 58 is provided, pivoted on a shaft 59 suitably mounted beneath the support 16 as by brackets 60 and 61, and extending upwardly through a cut-out 62 in the support to be connected to opposite ends of a pin 63 located in an elongated slot 64 in the base 53 of the U-shaped member.

With the confining arms 22 and 23 clamped in operative position, as shown in Figs. 1 and 3, a fluid under pressure is passed into the bag 34 from the inlet conduit 37. Control of the pressure of the fluid in the bag 34 may be achieved by suitable manipulation of valves 65 and 66 in the inlet and outlet conduits 37 and 38 as shown most clearly in Fig. 8. A pressure gauge 67 may advantageously be provided to indicate the pressure in the bag and to guide the operator in the manipulation of the valves.

The fluid used in the bag may be compressed air, steam, hot or cold water, hot or cold oil or any other suitable fluid medium adapted to exert an equalized pressure throughout the bag and against the laminated frame 21 associated with the forming means. Also, the fluid may be continuously circulated through the bag under pressure, or may be maintained against circulation in the bag by completely closing the valves. In the latter case, the fluid pressure is controlled by the extent of the drawing in of the confining arms 22 and 23 by the clamping device. In either case an equalized pressure is applied to the laminated frame by the fluid confined in the bag.

Advantageously, the fluid used in the bag is a heated fluid, such as steam, and is circulated in the bag under pressure which may be controlled by the inlet and outlet valves 65 and 66. Heat from the fluid serves to condition the adhesive between the veneer plies and to make possible a more secure bond. If as is preferred, a heat-hardening adhesive is used, the adhesive bond between the veneer sheets or plies may readily be set while the frame is being pressed and shaped on the forming means, and this in a relatively short period of time depending on the particular adhesive used and on the degree of heat and pressure employed. If a thermoplastic adhesive is used which is of the type that must cool in order to set or harden, then a cooling fluid under pressure may be circulated through the bag after the initial heat treatment and before pressure on the laminated frame is released.

Alternatively the fluid initially used may be at normal room temperature, as might be provided by compressed air, and the heat applied to the adhesive by a very flexible electrical resistance heater 70 such as shown in Figs. 4 and 5, which may be inserted between the inner wall 71 of the bag 34 and the laminated frame. As shown, this heater may include a very thin resistance ribbon 72, wound spirally on a thin flexible strip of wood veneer 73. When such a heater is used it is important that it be electrically insulated from the outer form 19 if the latter be of metal or other electricity-conducting material and that at least the inner wall 71 of the bag have a surface which is not adversely affected by heat.

To insure an adequate heating of the adhesive between the plies in the relatively thick handle section 74 of the frame 21, it may be desirable to utilize, as shown most clearly in Figs. 1, 2 and 3, a tail piece 75 adapted to be heated by electric resistance units 76 and 77 which may be suitably positioned in recesses 78 and 79 defined by tail piece sections 80 and 81. Advantageously the tail piece 75 may be of metal, having a reduced portion 82 at one end adapted to be fit in a socket 83 in the inner form 18 and having a portion 84 adapted to fit in an elongated slot 85 formed in the support 16.

With this construction the heated tail piece 75 is so located that it will be intermediate opposite leg portions 86 and 86' of the handle section 74 of the frame 21 and will thus supplement the outer heating means, as may be provided by a heated fluid in the bag or the flexible heater, in providing a proper heating of the adhesive.

Also, to further supplement the outer heating means, the inner form 18 which like the tail piece 75 and outer form 19 may be of metal, is advantageously formed with a central heating chamber 87 therein to and away from which, as by the conduits 88 and 89, steam, hot water or other suitable heating fluid may be conducted.

After a laminated frame has been shaped and the laminations or plies 33 thereof suitably bonded together in the manner above described, the confining arms 22 and 23 are opened, the frame is removed and the usual throat piece, plug, reinforcements, handle flakes and the like may be bonded to the shaped frame by any of the now well-recognized methods.

By increasing the width of the plies 33 and of the active pressing and shaping members of the apparatus 15 a shaped frame may be provided from which may be cut a plurality of individual racket frames. However, because the novel features of the present invention are independent of any particular size of apparatus, it is not deemed necessary to fully illustrate and describe an apparatus adapted to shape relatively wide plies.

The modified form of apparatus 15a shown in Fig. 6 is of basically the same construction as the apparatus illustrated in Figs. 1 through 3, including an inner form 90 having a tail piece 90' extending therefrom, and an outer form 91 comprising pivotally mounted confining arms 92 and 93 providing a channel 94 for locating a fluid-confining bag 34 which may be identical in construction with the bag 34 first described. This modified apparatus 15a, however, differs from the apparatus 15 in the provision of means whereby the adhesive between all of the plies 33 may be most uniformly and evenly heated.

For this purpose the inner form 90 and the outer form 91 are so constructed and associated that when connected with a high frequency electric circuit an electrostatic field is set up in the space locating the racket frame, and by this means the adhesive between all of the plies is subjected to uniform and penetrating electrostatic heat. In accomplishing this result one terminal 96 of a high-frequency alternating current circuit is connected to the inner form 90, which must be of metal or other electricity-conducting material, and another terminal 97 of the circuit is connected to the outer form 91, as at the point where the confining arms 92 and 93 are pivotally connected.

It is important, in this construction, that the inner and outer forms be electrically insulated and this may be readily accomplished by making the support 16a of insulating material and by securing the pivot stud 98 for the confining arms to the support 16a, as shown in Fig. 7, instead of to an extension on the inner form as was described in the case of the apparatus shown in Figs. 1 through 3.

In the operation of this modified apparatus, the laminated frame 21 with adhesive between the respective veneer plies 33, is first bent into a substantially U-shape and after the confining arms have been clamped, as by the device 50 shown in Fig. 3, a fluid under pressure is admitted to the bag 34 to exert an equalized pressure on the laminated frame throughout the length of the latter in the apparatus. In view of the electrostatic heating means provided it is not necessary to utilize any of the heating means described in connection with the apparatus 15. However, in all other respects, except for the manner of applying heat to the adhesive, the operation of the modified apparatus is seen to be exactly like that of the one shown in Figs. 1 through 3.

When a high-frequency current is applied to the apparatus, as by any suitable means, for example by a means such as described in an article titled Uniform vulcanization, by Heni Leduc, appearing at pages 193–200 in vol. IX, No. 2 (April 1936) of Rubber Chemistry and Technology, the central form 90 and tail piece 90' serve as one electrode, the adhesive as the medium highly resistant to electricity, and the confining arms 92 and 93 as the other electrode, an electrostatic field is set up between the inner form 90 and the tail piece 90' on one hand and the confining arms 92 and 93 on the other hand to uniformly heat the adhesive between all of the plies.

As shown in Figs. 7 and 8, this advantageous electrostatic heating may be applied in another modified apparatus 15b in which a plug 100, and throat piece 101 are associated and bonded to the bent laminated frame simultaneously with the pressing, bonding and shaping of the latter.

Thus, this modified apparatus 15b, unlike the apparatus 15 shown in Fig. 1 and the apparatus 15a shown in Fig. 6, includes an inner form 102 that is shaped to provide a recess 103 in which the throat piece 101 may be inserted and omits the metal tail piece to make room for a plug 100, as shown in Fig. 8, or, if desired, to permit opposite legs 86 and 86' of the frame 21 to be pressed directly against each other. It will be readily understood that a specially shaped inner form, such as the inner form 102, may be utilized with the apparatus shown in Fig. 1, if desired, to enable a simultaneous shaping of the frame and bonding of a throat piece 101 and/or a plug 100 thereto as by an adhesive such as is used in bonding the plies of the frame 21.

With the modified apparatus 15b, it is to be noted that the confining arms 104 and 105, which are pivotally mounted in the same manner as described in connection with the confining arms 92 and 93 shown in Fig. 6 and are provided with a like channel 106 for locating the fluid-confining bag 34, are each formed in two sections 107 and 108 electrically insulated from each other as by a fiber insulator 109. These insulators 109, as best seen in Fig. 7, include a central rib portion 110 which separates the sections 107 and 108 and laterally extending portions 111 and 112 having sockets 113 and 114 therein for respectively receiving the webs 115 and 116 of the adjacent sections 107 and 108. Suitable bolt and nut connections 117 may be provided for effectively securing the insulators to the confining arm sections 107 and 108 and the latter to each other.

This latter insulating construction is necessary in order to enable the setting up of a suitable electrostatic field in the handle portion of the frame when no tail piece 90' is utilized. Thus, with the insulated construction, two electrostatic fields are set up, one for heating the adhesive in the head 20 of the frame 21 and the other for heating the adhesive in the handle 74 of the frame. To this end one terminal 120 for one circuit is secured to the sections 107 of the two confining arms 104 and 105 embracing the head of the frame and the other terminal 121 for that circuit is secured to the inner form in the same manner as with the apparatus shown in Fig. 6. In addition, however, a terminal 122 for another circuit is connected to the insulated section 108 of one of the confining arms 104 and the other terminal 123 for the latter circuit is secured to the insulated section 108 of the other confining arm 105. The electrostatic heating action of the two electrostatic fields set up in the apparatus, it will be readily appreciated, is similar to the electrostatic heating action of the one electrostatic field set up in the apparatus 15b.

With all of the forms of apparatus described it is seen that there are provided means for advantageously carrying out a method for shaping and bonding racket frames, which method includes the steps of bending a plurality of superposed veneer sheets with an adhesive (preferably a heat-hardening adhesive) therebetween into a substantially U-shape, applying fluid pressure to the bent sheets through a flexible member to press the same together and into a predetermined racket shape, and applying heat to the adhesive which may be followed by the application of cold if the adhesive is of a thermoplastic type which becomes plastic when hot and does not set until reduced to normal or cold temperature.

Also, it is seen that with the method provided by the present invention, while the heating of the adhesive may be and preferably is effected simultaneously with the shaping and pressing of the frame, as for example by a heated fluid in the bag or by electrostatic heating means, the heating of the adhesive may be effected subsequent to the shaping operation, as by placing the shaped frame, while held under pressure, in a heated chamber.

In several of the illustrated forms of apparatus, the fluid-confining bag is shown as located in a channel provided in the confining arms 22 and 23. However, it will be readily appreciated that without departing from the spirit of the present invention, the bag could likewise be located in a channel provided in the inner form and the laminated frame pressed outwardly toward the confining arms 22 and 23 to effect a predetermined shaping and bonding thereof. Also, it is to be understood that while the method and apparatus have been particularly described in connection with rackets, that they may be utilized in making other shaped and laminated articles.

Variations and modifications may be made within the scope of this invention and portions of the improvements may be used without others.

Having thus described the invention, what is claimed as new is:

1. In an apparatus for making an article, the combination of a supporting structure, an inner forming member secured thereto, outer forming members positioned on either side of said inner forming member and pivotally secured to said supporting structure for movement into and out of cooperative association with said inner forming member, a clamping unit including means for engaging the outer sides of the outer forming members for retaining said outer forming members in operative position with reference to said inner forming member, a mounting pivotally attached to one edge of said supporting structure and having a pivotal and slidable connection with said clamping unit, whereby said clamping unit may be moved from operative clamping position to a position permitting the outer forming members to be moved out of operative association with said inner forming member.

2. The invention as defined in claim 1, wherein the outer forming members are provided on their surfaces cooperating with the inner forming member with a fluid bag extending for the full length thereof.

3. In an apparatus for making an article from laminated strips secured together by heat-setting adhesive, the combination of a supporting structure, an inner forming member secured thereto, outer forming members positioned on either side of said inner forming member and pivotally secured to said supporting structure for movement into and out of cooperative association with said inner forming member, a clamping unit including means for engaging the outer sides of the outer forming members for retaining said outer forming members in operative position with reference to said inner forming member, a mounting pivotally attached to one edge of said supporting structure and having a pivotal and slidable connection with said clamping unit, whereby said clamping unit may be moved from operative clamping position to a position permitting the outer forming members to be moved out of operative association with said inner forming member, and heating means adjacent the strip-engaging surfaces for heating the assembled and clamped strips and adhesive to permanently secure said strips together.

JOHN B. DICKSON.
LLOYD E. BURNS.